United States Patent
Silberberg

(10) Patent No.: US 7,802,372 B1
(45) Date of Patent: Sep. 28, 2010

(54) REMOVABLE LASER BASE ATTACHMENT FOR BUBBLE LEVELS

(75) Inventor: Mark L. Silberberg, Rancho Palos Verdes, CA (US)

(73) Assignee: Precision Designed Products, Inc., Torrance, CA (US)

(*) Notice: Subject to any disclaimer, the term of this patent is extended or adjusted under 35 U.S.C. 154(b) by 28 days.

(21) Appl. No.: 12/189,255

(22) Filed: Aug. 11, 2008

(51) Int. Cl.
*G01C 9/28* (2006.01)
(52) U.S. Cl. .................. 33/451; 33/371; 33/DIG. 21
(58) Field of Classification Search .............. 33/227, 33/286, 347, 354, 370, 371, 379, 451
See application file for complete search history.

(56) References Cited

U.S. PATENT DOCUMENTS

| | | | | |
|---|---|---|---|---|
| 2,502,235 | A * | 3/1950 | Schultes et al. | 33/381 |
| 5,568,265 | A * | 10/1996 | Matthews | 33/286 |
| 5,604,987 | A * | 2/1997 | Cupp | 33/DIG. 21 |
| D411,470 | S | 6/1999 | Webb | |
| 6,167,630 | B1 | 1/2001 | Webb | |
| 6,839,974 | B1 * | 1/2005 | Hitchcock | 33/451 |
| 7,073,268 | B1 | 7/2006 | Etter et al. | |
| 7,464,478 | B2 * | 12/2008 | Adrian | 33/286 |
| 2001/0034944 | A1 * | 11/2001 | Cunningham | 33/286 |
| 2003/0005590 | A1 * | 1/2003 | Snyder | 33/370 |
| 2005/0229416 | A1 * | 10/2005 | Kim | 33/451 |
| 2006/0000099 | A1 * | 1/2006 | Tessel et al. | 33/414 |
| 2006/0137200 | A1 * | 6/2006 | Lollar et al. | 33/371 |
| 2006/0265891 | A1 * | 11/2006 | Murphy | 33/379 |
| 2007/0234581 | A1 * | 10/2007 | Ming | 33/451 |
| 2008/0250662 | A1 * | 10/2008 | Allemand | 33/379 |
| 2009/0067936 | A1 * | 3/2009 | Angelisanti | 33/354 |

* cited by examiner

*Primary Examiner*—G. Bradley Bennett
(74) *Attorney, Agent, or Firm*—Altman & Martin; Steven K. Martin

(57) ABSTRACT

A removable laser base for a bubble level that includes a body, a laser beam generator, and a removable securement. The body has a flat top surface that the level is secured to and a bottom surface that is flat and parallel to the top surface. A laser diode mounted in a module emits a visible laser beam upon application of power from a battery that is controlled by a switch. The module, batteries, and switch are mounted in a through bore in the body. The laser base is removably secured to the bubble level by any manner appropriate to the shape of the level. In one such securement, the level has a T-shaped cross-section and the body has a complementary slot into which the level slides. When the level reference surface abuts the top surface of the laser base, a thumb screw is tightened to frictionally secure the level in the base.

13 Claims, 6 Drawing Sheets

REMOVABLE LASER BASE ATTACHMENT FOR BUBBLE LEVELS

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to leveling instruments, more particularly, to levels that uses a laser beam to project a reference dot or line.

2. Description of the Related Art

Laser levels have been used in the construct business for many years. A laser level uses a laser beam to project a straight line for reference. A spirit vial in the level permits the user to make sure that the line is horizontal or vertical. Laser levels are heavier and larger than levels without lasers, so when the laser function is not needed, the extra bulk and weight can be an inconvenience. Also, two levels, one with and one without a laser, needlessly takes up space, since generally only one of them is needed at a time.

BRIEF SUMMARY OF THE INVENTION

An object of the present invention is to provide a laser attachment for a bubble level.

Another object is to provide a laser attachment for a bubble level that is removable.

The present invention is a removable laser base for a bubble level that attaches to a reference surface of the bubble level. The laser base includes a body, a laser beam generator, and a level securement.

The body has a flat top surface that the level is secured to and a bottom surface that is flat and parallel to the top surface. Optionally, one or more magnets are embedded in the bottom surface. Optionally, there is a longitudinal groove in the bottom surface to help hold the base stable against a cylindrical surface.

A laser diode mounted in a module emits a visible laser beam upon application of power from a battery that is controlled by a switch. The module, batteries, and switch are mounted in a through bore. The switch is an electrically-conductive fitting with an external thread that turns into the internal thread in the bore. As the fitting is turned into the bore, it eventually makes contact with the batteries, thereby applying power to the laser diode.

The laser base can be removably secured to the bubble level by any manner appropriate to the shape of the bubble level. In one such securement, the level has a T-shaped cross-section and the body has a complementary slot into which the level slides. When the level reference surface abuts the top surface of the laser base, a thumb screw is tightened to secure the level in the base via friction.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
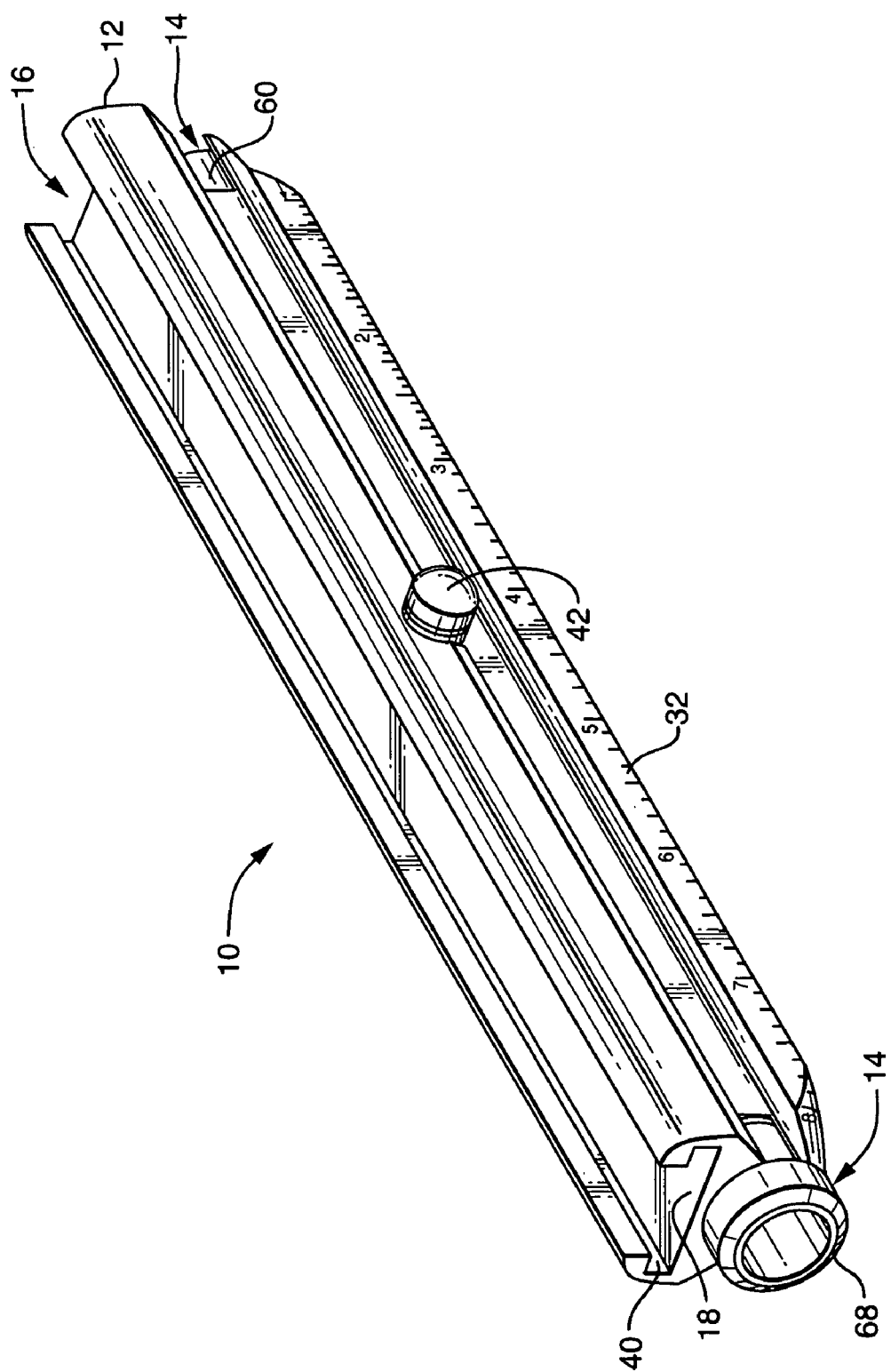
FIG. 1 is a side, perspective view of the laser base of the present invention.

The present invention is a laser base 10 for a bubble level. The base 10 removably attaches to a reference surface of the bubble level 8, where the reference surface is one at known angles to the bubble vials. The laser base 10 includes a body 12, a laser beam generator 14, and a level securement 16.

The body 12 is composed of a rigid, stable material. Examples of contemplated materials include plastics, fiberglass, carbon composites, and metals, such as aluminum alloys, steel, and titanium alloys. Depending on the material, the body 12 can be cast, machined, molded, or formed by any means available. If the body 12 is composed of a relatively less rigid material, such as some plastics, a hard, rigid stiffener may be embedded to prevent the base 10 from flexing.

The body 12 has a flat, longitudinal top surface 18, which is the surface to which the bubble level 8 is secured, as described below. The bottom surface 20 of the body 12 is flat and parallel to the top surface 18. This is so that the bubble level 8 reads properly when the base 10 is attached and resting on the surface to be measured.

Typically, although not necessarily, the base 10 will be about the same length as the level 8 with which it is designed to be used. Optionally, the body 12 is marked along the bottom surface 20 with a ruler 32, either in inches or metric.

Figure 2:
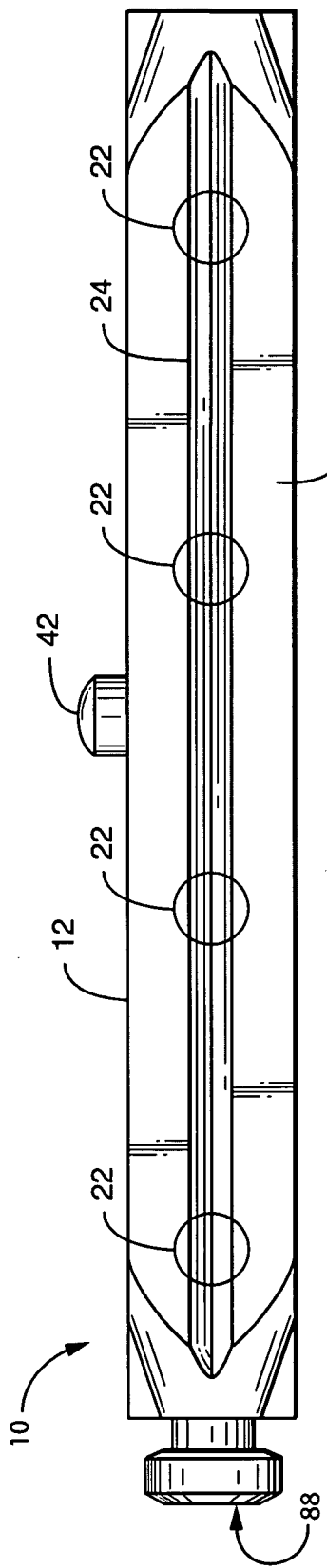
FIG. 2 is a bottom view of the laser base of FIG. 1 with options.

Optionally, as shown in FIG. 2, one or more magnets 22 are embedded in the bottom surface 20. The magnets 22 provide a means to removably attach the base 10 to ferrous surfaces without having to manually hold it in place. This is particularly useful for non-horizontal surfaces.

Figure 3:
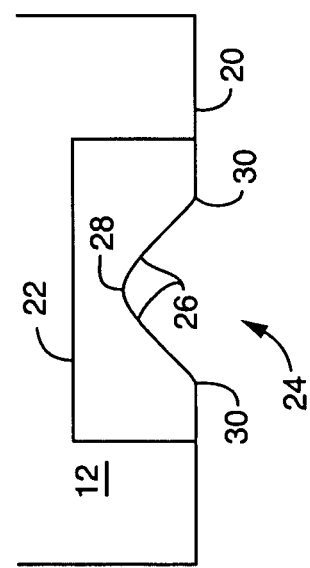
FIG. 3 is a close up, cross-sectional view of the laser base groove.

Optionally, as shown in FIG. 2, there is a longitudinal groove 24 in the bottom surface 20. The purpose of the groove 24 is to help hold the base 10 stable against a cylindrical surface, such as a water pipe or electrical conduit. As shown in FIG. 3, the groove 24 is generally V-shaped, with side walls 26 that slope inwardly. The side walls 26 come together at an inside corner 28 that is parallel to the axis 18 so that the groove 24 is parallel to the axis 18. The edges 30 are typically rounded. In the configuration of FIG. 2, the groove 24 extends through the face of the optional embedded magnets 22.

Figure 4:
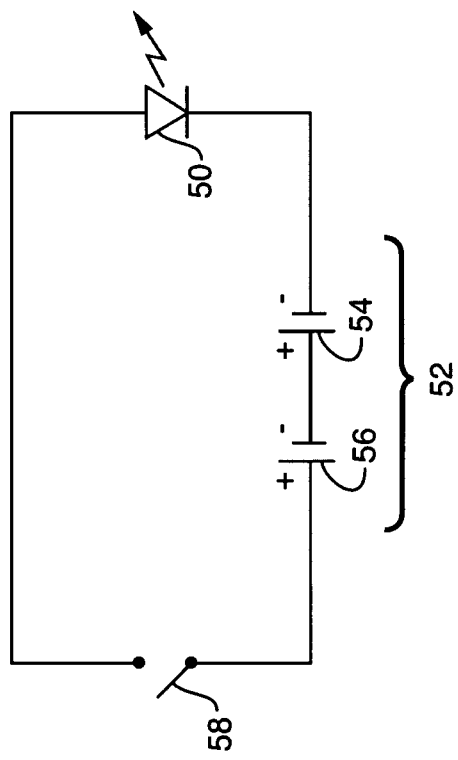
FIG. 4 is an electrical schematic diagram of the laser beam generator.

An electrical schematic diagram of the laser beam generator 14 is shown in FIG. 4. A laser diode 50 emits a visible laser beam, typically red, upon application of power from a power source 52, typically a battery of one or more cells 54, 56. The battery power is controlled by a switch 58. The laser diode 50 is mounted in a module 60. The module 60 has an electrically-conductive, cylindrical housing 62 with a larger, beveled end 64 and an electrically-conductive spring 66 at the other end. The laser diode 50 is mounted within the housing 62 such that the laser beam is emitted from the larger, beveled end 64. The anode of the laser diode 50 is electrically connected to the housing 62 and the cathode is electrically connected to the spring 66.

Figure 5:
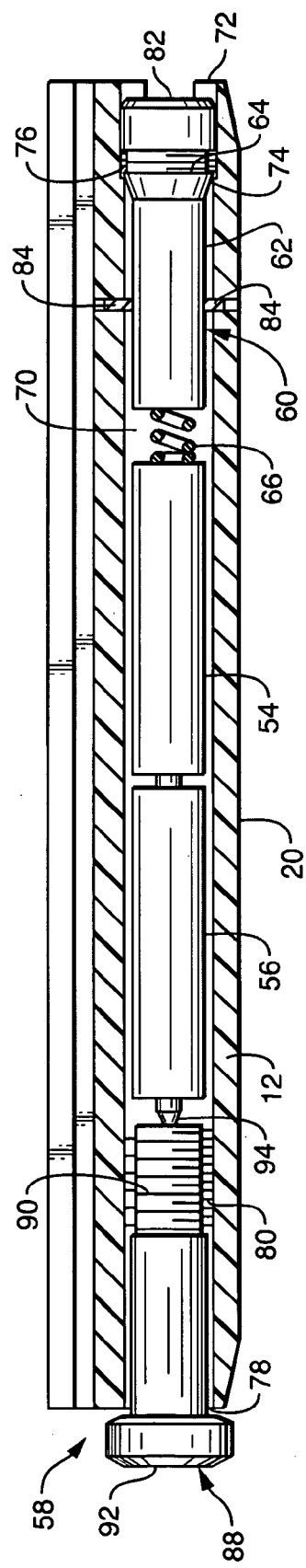
FIG. 5 is an assembled, cross-sectional view of the laser base of FIG. 1.
Figure 6:
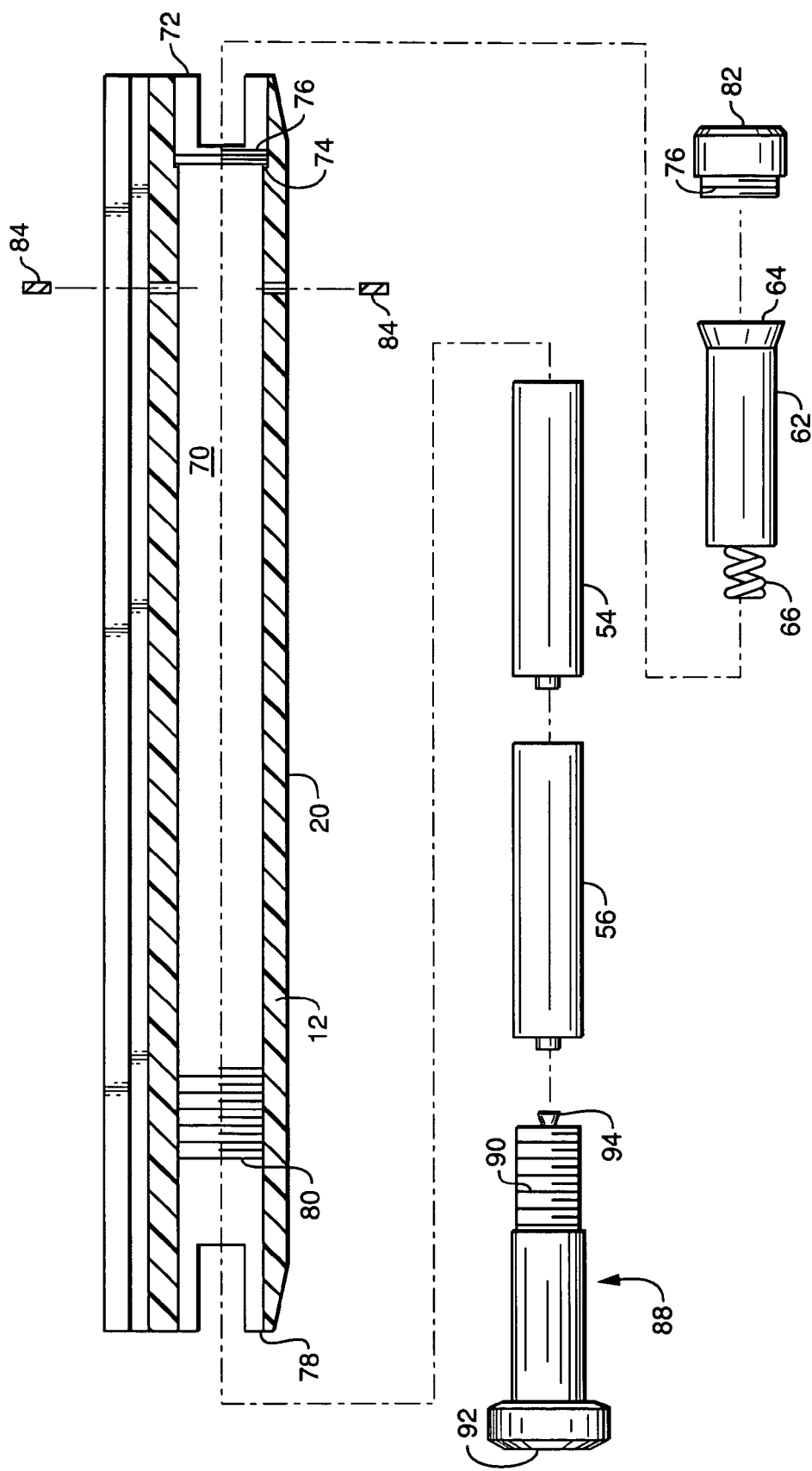
FIG. 6 is an exploded, cross-sectional view of the laser base of FIG. 1.

As shown in FIGS. 5 and 6, the body 12 includes a through bore 70 into which the laser beam generator components reside. One end 72 of the bore 70 has a shoulder 74 and internal threads 76 and the other end 78 of the bore 70 has internal threads 80. The module 60 fits snuggly in the bore 70 against the shoulder 74. Set screws 84 are installed to both secure the module 60 in position and to the adjust the position of the module 60 so that the laser beam is emitted parallel to the top surface 18 and at a known, fixed distance from the bottom surface 20, typically ½ inch. A fitting 82 is turned into the threads 76.

The cells 54, 56 slide into the bore 70 from the other end 78 such that the negative terminal of the first cell 54 contacts the spring 66 and the negative terminal of the second cell 56 contacts the positive terminal of the first cell such that the cells are in series. The positive terminal of the second cell 56 is free. Obviously, if there are more than two cells, the additional cells also slide in the bore in series.

In the present embodiment, the switch 58 is an electrically-conductive fitting 88 with an external thread 90 that turns into the internal thread 80. The fitting 88 has a large, knurled knob 92 so that the fitting 88 can be turned manually. As the fitting 88 is turned into the bore 70, the fitting tip 94 eventually makes contact with the positive terminal of the second cell 56, conducting the cell 56 to the thread 80.

In order to complete the circuit, at least a portion of the body 12 is electrically conductive to provide an electrical path from the module housing 62 to the thread 80 at the other end of the bore 70. If the body 12 is composed of an electrically-conductive material, such as an aluminum alloy, the body itself completes the circuit. If the body 12 is composed of a non-electrically-conductive material, an electrically-conductive path is provided.

The laser beam is turned on by turning the fitting 88 clockwise into the body 12 until the fitting tip 94 contacts the second cell 56. The laser beam is turned off by turning the fitting counterclockwise until the fitting tip 94 no longer contacts the second cell 56.

Figure 7:
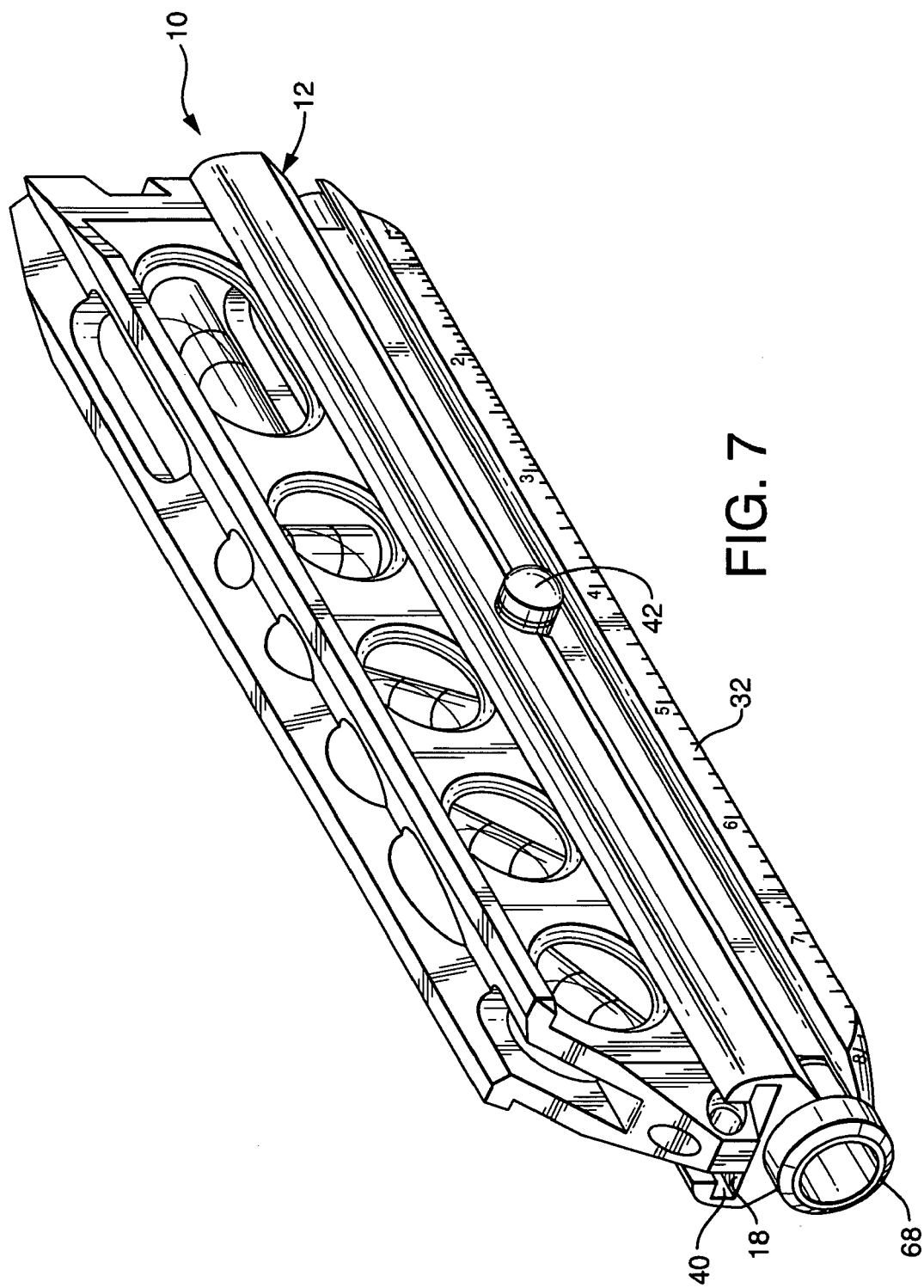
FIG. 7 is an end, perspective view of the laser base of FIG. 1 with a bubble level secured thereto.
Figure 8:
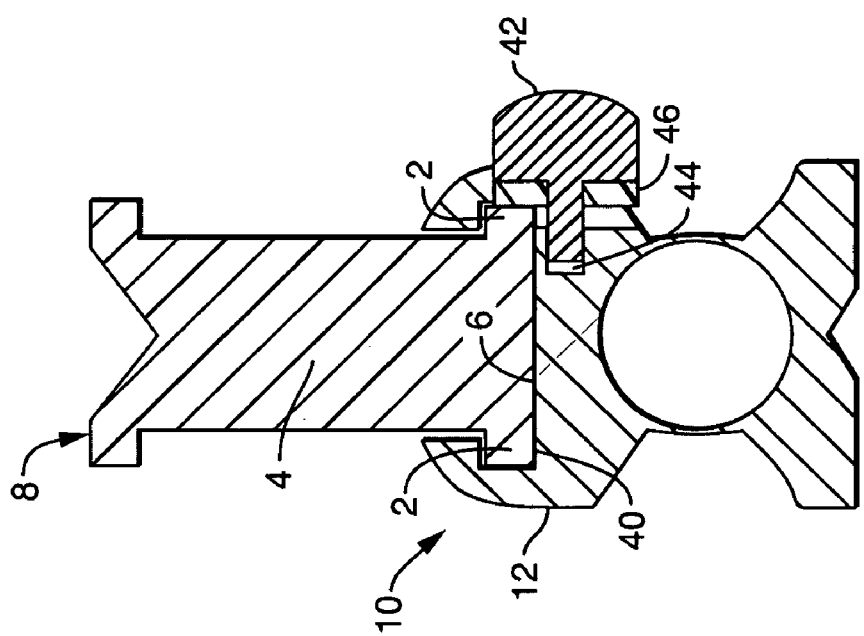
FIG. 8 is an end view of the laser base/bubble level assemblage of FIG. 7.

The laser base 10 of the present invention can be removably secured to the bubble level 8 by any manner appropriate to the shape of the bubble level 8. One such securement is shown in FIGS. 7 and 8. The level 8 has a T-shaped cross-section, with a reference surface 6, a central portion 4, and a pair of opposed extensions 2. The body 12 has a complementary slot 40 into which the level 8 slides. The top surface 18 is the floor of the slot 40. When the level 8 is in the correct position on the body 12, that is, when the level reference surface 6 abuts the top surface 18, a thumb screw 42 is tightened to secure the level 8 in the base 10 via friction. The thumb screw 42 turns into a threaded hole 44 adjacent to the slot 40 from the outer surface. In order to protect the level 8 from damage from the screw 42, a washer 46 composed of a relatively soft, more resilient material provides the friction securement.

Thus it has been shown and described a laser base for a bubble level which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A laser base for a bubble level having a reference surface, said laser base comprising:
    (a) a body having a first end, a second end, a flat, longitudinal top surface extending between said ends, and a flat bottom surface parallel to said top surface;
    (b) a laser module mounted in said body that emits a laser beam parallel to said top surface upon application of power;
    (c) a power source providing said power for said laser module;
    (d) a switch for controlling application of said power source to said laser module; and
    (e) a securement for removably attaching said bubble level.

2. The laser base of claim 1 wherein said securement is comprised of a longitudinal slot having said top surface as a floor and adapted to receive said bubble level such that said reference surface abuts said top surface.

3. The laser base of claim 2 wherein said securement is further comprised of a thumb screw extending adjacent to said slot to frictionally retain said bubble level in said slot.

4. The laser base of claim 2 wherein said slot has a T-shaped cross-section.

5. The laser base of claim 1 wherein said body includes a through bore extending generally parallel to said top surface between said ends, said laser module and power source being mounted in said bore.

6. The laser base of claim 5 wherein said switch is mounted in said bore.

7. The laser base of claim 1 wherein said laser beam is at a fixed and known distance from said bottom surface.

8. The laser base of claim 1 further comprising magnets embedded in said bottom surface.

9. The laser base of claim 1 wherein said bottom surface has a longitudinal groove.

10. A laser base for a bubble level having a reference surface, said laser base comprising:
    (a) a body having a first end, a second end, a flat, longitudinal top surface extending between said ends, and a flat bottom surface parallel to said top surface;
    (b) a laser module mounted in said body that emits a laser beam parallel to said top surface upon application of power, said laser beam at a fixed and known distance from said bottom surface;
    (c) a power source providing said power for said laser module;
    (d) a switch for controlling application of said power source to said laser module; and
    (e) a securement for removably attaching said bubble level, said securement including a longitudinal T-shaped slot having said top surface as a floor and adapted to receive said bubble level such that said reference surface abuts said top surface, and a thumb screw extending adjacent to said slot to frictionally retain said bubble level in said slot.

11. The laser base of claim 10 wherein said body includes a through bore extending generally parallel to said top surface between said ends, said laser module, power source, and switch being mounted in said bore.

12. The laser base of claim 10 further comprising magnets embedded in said bottom surface.

13. The laser base of claim 10 wherein said bottom surface has a longitudinal groove.

* * * * *